US009170772B2

(12) United States Patent
Kuo

(10) Patent No.: US 9,170,772 B2
(45) Date of Patent: Oct. 27, 2015

(54) METHOD AND APPARATUS FOR DECIMAL FLOATING-POINT DATA LOGICAL EXTRACTION

(75) Inventor: Shihjong J. Kuo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 13/991,885

(22) PCT Filed: Dec. 23, 2011

(86) PCT No.: PCT/US2011/067072
§ 371 (c)(1),
(2), (4) Date: Jun. 5, 2013

(87) PCT Pub. No.: WO2013/095600
PCT Pub. Date: Jun. 27, 2013

(65) Prior Publication Data
US 2014/0019506 A1  Jan. 16, 2014

(51) Int. Cl.
  *G06F 7/483* (2006.01)
  *G06F 7/491* (2006.01)
  *G06F 5/00* (2006.01)

(52) U.S. Cl.
  CPC ........ *G06F 7/483* (2013.01); *G06F 5/00* (2013.01); *G06F 7/491* (2013.01); *G06F 2205/003* (2013.01); *G06F 2207/4911* (2013.01)

(58) Field of Classification Search
  USPC ......................................... 708/204, 495–499
  See application file for complete search history.

(56) References Cited

U.S. PATENT DOCUMENTS

| 7,016,928 | B2 | 3/2006 | Steele, Jr. et al. |
| 7,685,214 | B2 | 3/2010 | Chen et al. |
| 7,877,431 | B2 | 1/2011 | Dahms et al. |
| 8,468,184 | B2 | 6/2013 | Lundvall et al. |
| 2012/0259904 | A1 * | 10/2012 | Bishop ................... 708/503 |

OTHER PUBLICATIONS

PCT International Search Report for PCT Counterpart Application No. PCT/US2011/067072, 3 pgs., (Aug. 27, 2012).
PCT Written Opinion of the International Searching Authority for PCT Counterpart Application No. PCT/US2011/067072, 4 pgs., (Aug. 27, 2012).
PCT Notification concerning Transmittal of International Preliminary Report on Patentability (Chapter I of the Patent Cooperation Treaty) for PCT Counterpart Application No. PCT/US2011/067072, 6 pgs., (Jul. 3, 2014).
Corena, Marius, et al., "A Software Implementation of the IEEE 754R Decimal Floating-Point Arithmetic Using the Binary Encoding Format", IEEE Transactions, 2009, vol. 58, Issue: 2.
Wang, Liang-Kai, et al., "Benchmarks and Performance Analysis of Decimal Floating-Point Applications", ICCD 25$^{th}$ International Conference on DOI, 2007.

(Continued)

*Primary Examiner* — Chat Do
*Assistant Examiner* — Calvin M Brien
(74) *Attorney, Agent, or Firm* — Nicholson De Vos Webster & Elliott LLP

(57) ABSTRACT

Embodiments of systems, apparatuses, and methods for performing BIDSplit instructions in a computer processor are described. In some embodiments, the execution of a BIDSplit instruction tests the encoding of a binary-integer decimal source value and extracts a sign, exponent, and/or significand into a destination.

17 Claims, 17 Drawing Sheets

(56) References Cited

OTHER PUBLICATIONS

Erle, Mark A., et al., "Decimal Floating-Point Multiplication", IEEE Transactions DOI, 2009, vol. 58, Issue: 7.

Cowlishaw, Michael F., "Decimal Floating-Point: Algorism for Computers", Computer Arithmetic Proceedings, 16$^{th}$ IEEE Symposium on DOI, 2003.

Cornea, Marius, "Intel Decimal Floating-Point Math Library", http://software.intel.com/en-us/blogs/2008/03/06/intel-decimal-floating-point-math-library/, Intel Blogs, Mar. 6, 2008.

Silminds, "DFPA Hardware Accelerator Cards" http://www.silminds.com/dl/SilAx-1.0-Datasheet.pdf SilAx, Date Unknown.

Wikipedia_Decimal64:http://en.wikipedia.org/w/index.php?oldid=414802859.

Wikipedia_Decimal128:http://en.wikipedia.org/w/index.php?oldid.412180273.

IEEE Computer Society, "IEEE Standard for Floating-Point Arithmetic", IEEE Std 754, Aug. 29, 2008, New York, NY.

González-Navarro, "A Binary Integer Decimal-based Multiplier for Decimal Floating-Point Arithmetic", Signals, Systems and Computers, 2007. ACSSC 2007. Conference Record of the Forty-First Asilomar Conference on DOI, 2007.

Tang Peter, Tak Ping, "BID—Binary Integer Decimal Encoding for Decimal Floating Point", Software Solutions Group, Intel Corporation, Jul. 12, 2005.

* cited by examiner

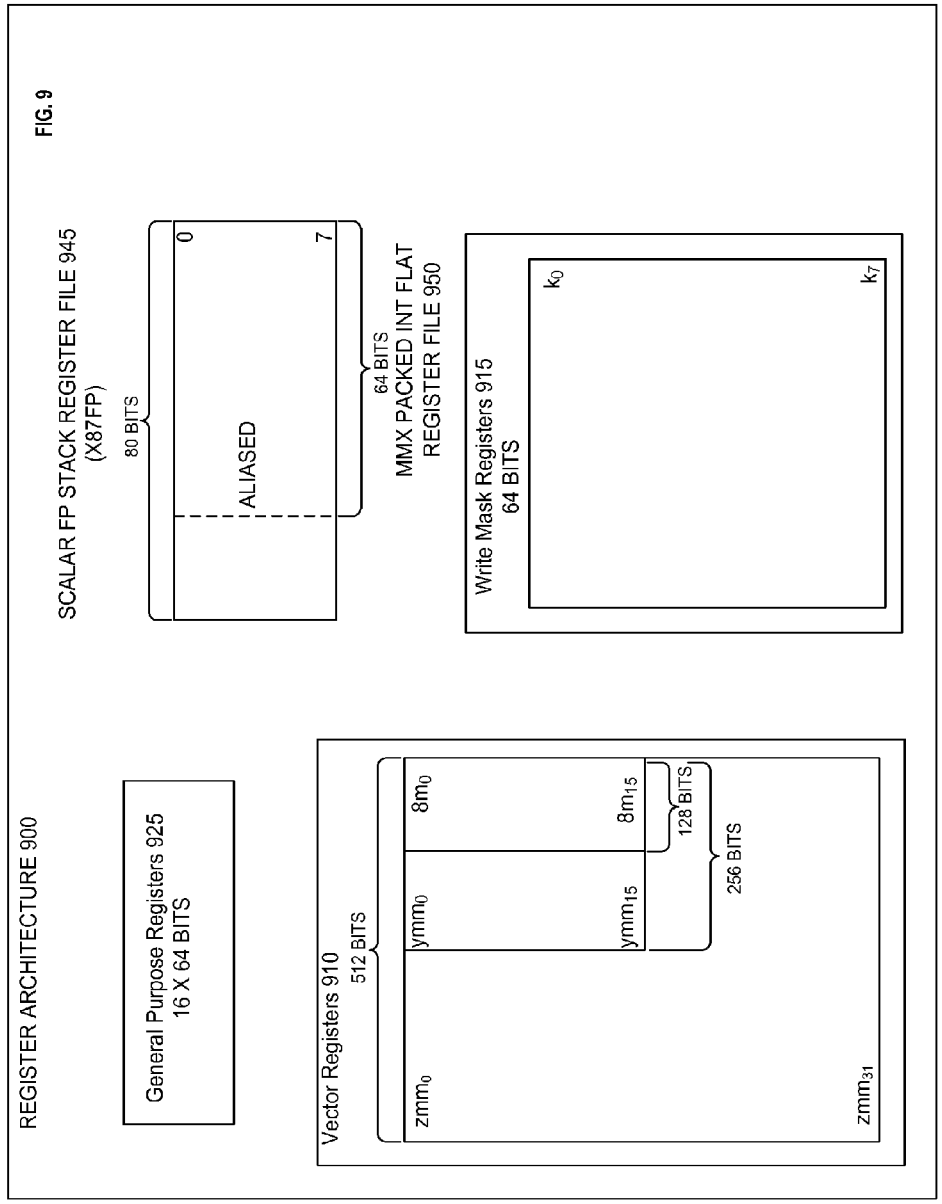

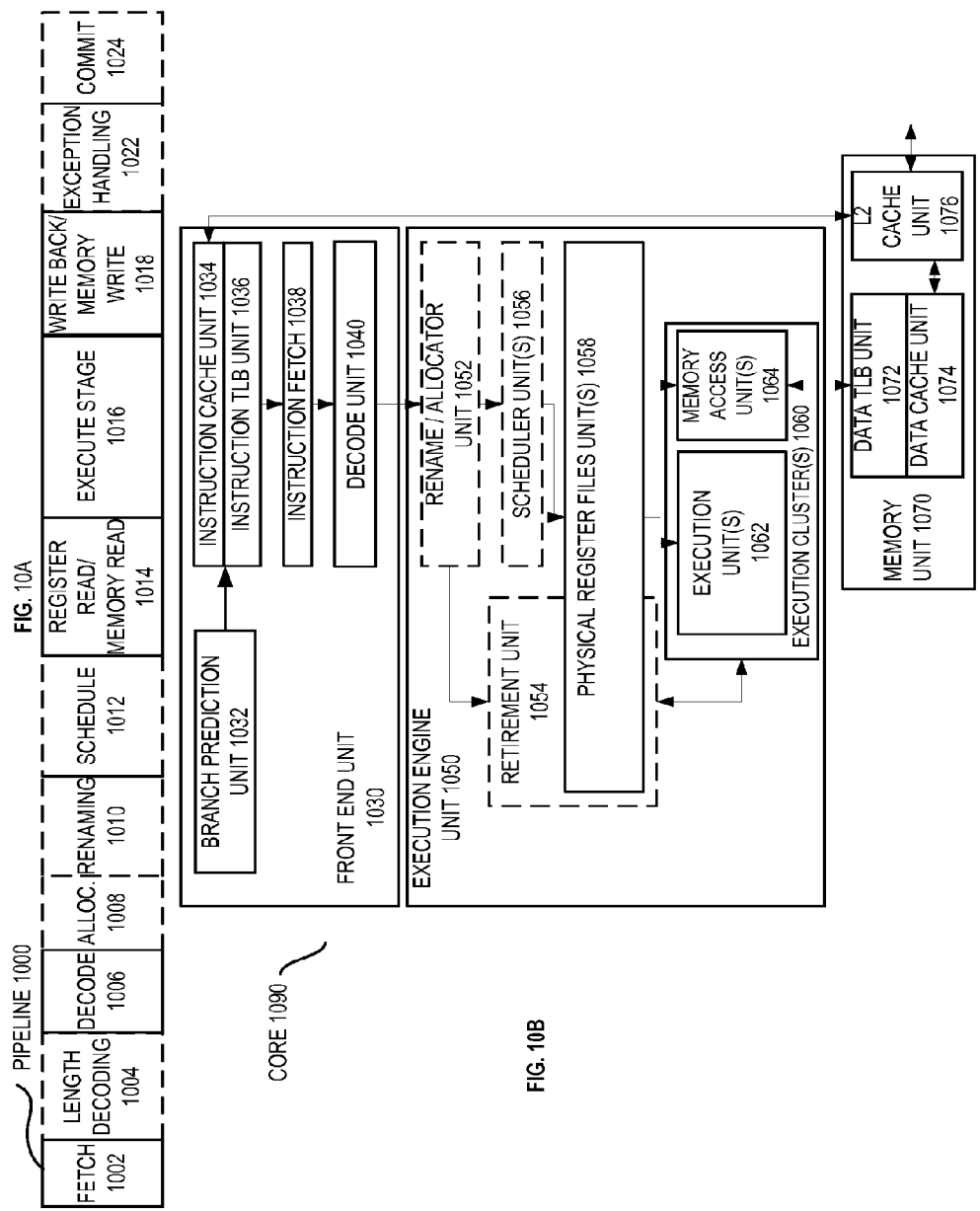

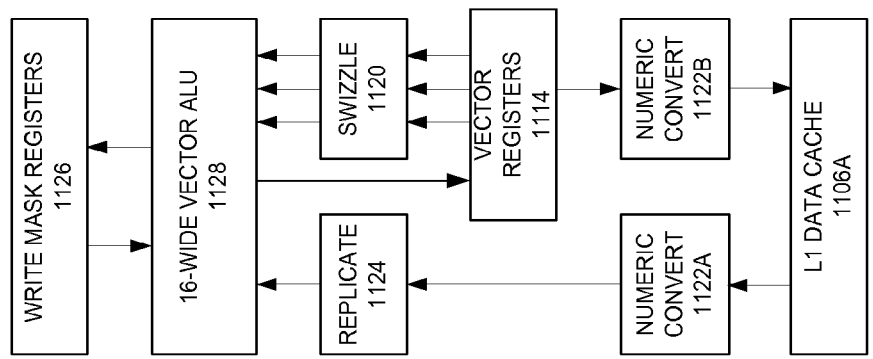
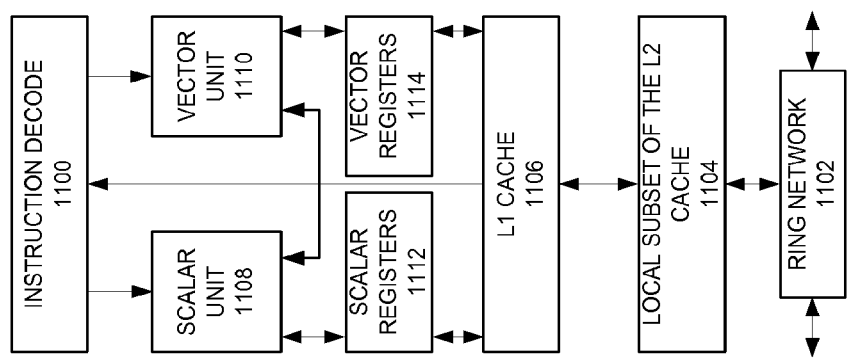

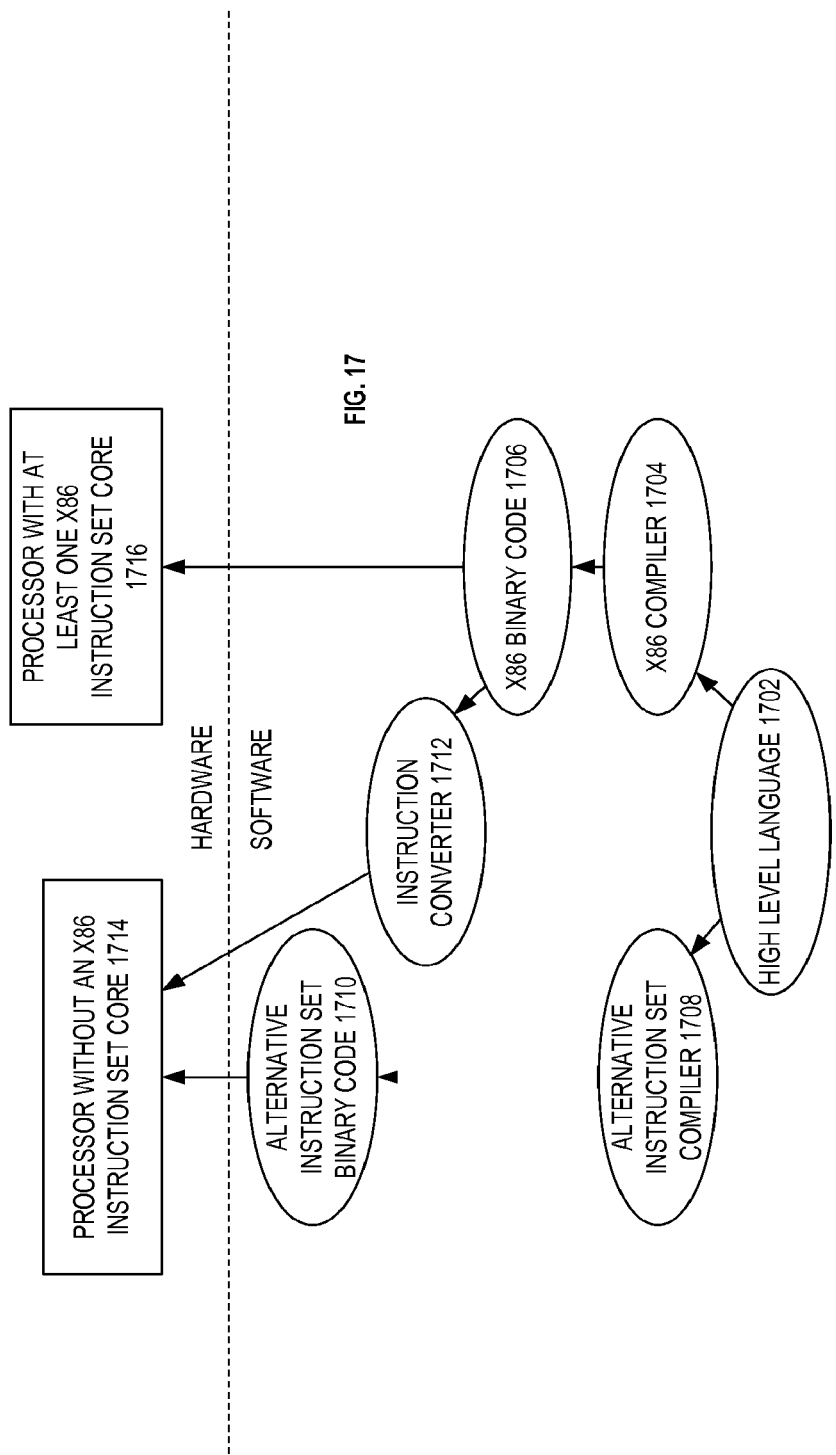

METHOD AND APPARATUS FOR DECIMAL FLOATING-POINT DATA LOGICAL EXTRACTION

CROSS-REFERENCE TO RELATED APPLICATION

This patent application is a U.S. National Phase Application under 35 U.S.C. §371 of International Application No. PCT/US2011/067072, filed Dec. 23, 2011, entitled METHOD AND APPARATUS FOR DECIMAL FLOATING-POINT DATA LOGICAL EXTRACTION.

FIELD

The field of invention relates generally to computer processor architecture, and, more specifically, to instructions which when executed cause a particular result.

BACKGROUND

Decimal floating-point arithmetic is especially important in computer applications that require decimal fractions to be represented exactly. Because traditional binary floating-point arithmetic does not provide optimal decimal rounding facilities and cannot precisely represent many fractions, it imposes extra burdens when used for applications sensitive to decimal rounding errors. For example, banking, insurance, and other financial applications utilizing these numeric representations would employ additional software modules to correct for rounding errors, otherwise they would suffer from rounding error propagation. Decimal floating-point encoding avoids these shortfalls because it can represent decimal fractions exactly and provide arithmetic results that will equal traditional pen-and-paper calculations.

Two standards for encoding values using decimal floating-point are presented in IEEE-754-2008. One of these standards is known as binary-integer decimal, in which a number is encoded using a significand, exponent, and sign. Typically, applications requiring computations utilizing binary-integer decimal encodings make use of software libraries using scalar instruction sets and serially-dependent algorithms to identify and decode these values.

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the microarchitecture, which is the internal design of the processor implementing the instruction set. Processors with different microarchitectures can share a common instruction set. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB), and a retirement register file; the use of multiple maps and a pool of registers), etc. Unless otherwise specified, the phrases register architecture, register file, and register are used herein to refer to that which is visible to the software/programmer and the manner in which instructions specify registers. Where a specificity is desired, the adjective logical, architectural, or software visible will be used to indicate registers/files in the register architecture, while different adjectives will be used to designation registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down through the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform an operation on multiple data items. SIMD technology is especially suited to processors that can logically divide the bits in a register into a number of fixed-sized data elements, each of which represents a separate value. For example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as packed data type or vector data type, and operands of this data type are referred to as packed data operands or vector operands. In other words, a packed data item or vector refers to a sequence of packed data elements, and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that has only one or has more than two source vector operands, that operate in a horizontal fashion, that generates a result vector operand that is of a different size, that has a different size data elements, and/or that has a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

BRIEF DESCRIPTION OF THE DRAWINGS

The present invention is illustrated by way of example and not limitation in the figures of the accompanying drawings, in which like references indicate similar elements and in which:

FIG. 9 is a block diagram of a register architecture according to one embodiment of the invention.

FIG. 10A is a block diagram illustrating an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention.

FIG. 11A is a block diagram of a single processor core, along with its connection to the on-die interconnect network and with its local subset of the Level 2 (L2) cache, according to embodiments of the invention.

FIG. 11B is an expanded view of part of the processor core in FIG. 11A according to embodiments of the invention.

FIG. 17 is a block diagram contrasting the use of a software instruction converter to convert binary instructions in a source instruction set to binary instructions in a target instruction set according to embodiments of the invention.

DESCRIPTION OF EMBODIMENTS

Figure 1:
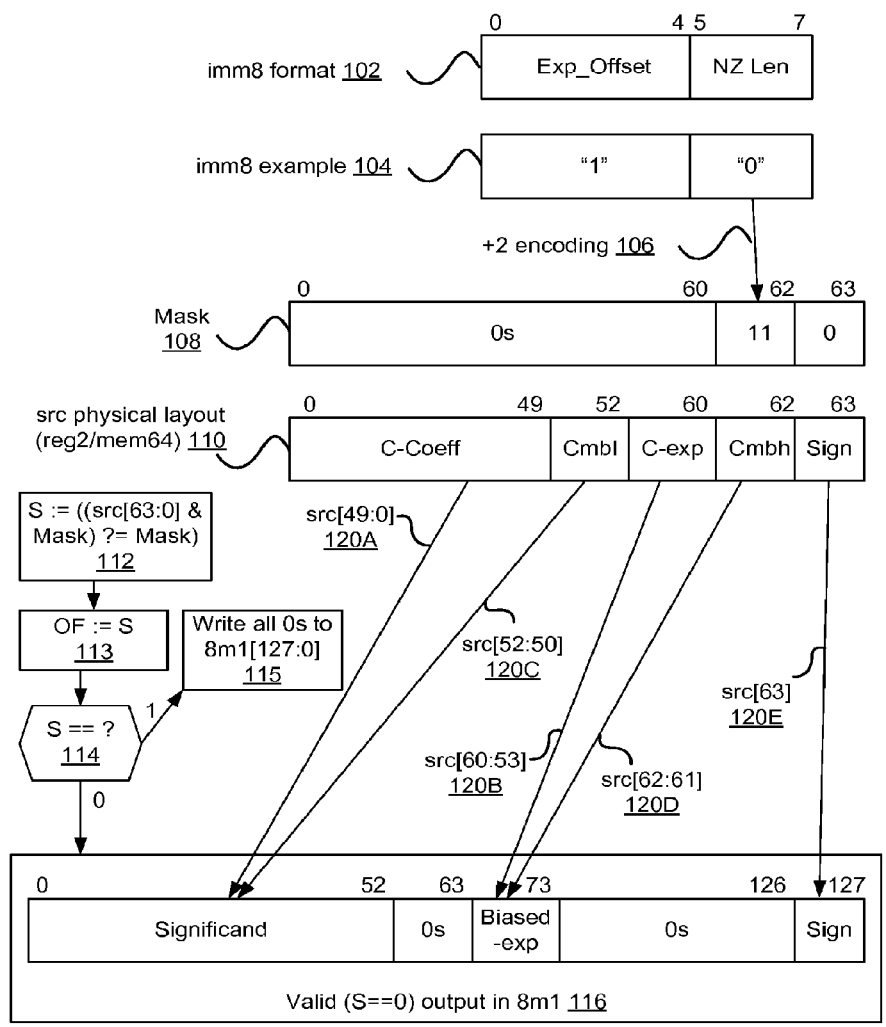
FIG. 1 illustrates an embodiment of the invention for performing a BID64Split instruction for 53-bit extraction in a processor.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As detailed earlier, binary-integer decimal (BID) is one of two primary encoding standards for representing decimal floating-point (DFP) values as described by IEEE-754-2008. This standard details encodings for different precisions of floating-point numbers, such as single precision using 32 bits (decimal32), double precision using 64 bits (decimal64), and quadruple precision using 128 bits (decimal128). BID-encoded DFP numbers typically contain three important components—a sign, exponent, and significand. Within a BID-encoded number, the layout of these components consists of three logical fields with variable bit-lengths and/or non-contiguous locations. When the bit fields are extracted, the resulting components may be used to reconstruct the original DFP value. In decimal64, for example, the original DFP value may be reconstructed using the following expression: $(-1)^{sign} * 10^{exponent-398} * significand$. Similarly, in decimal128, the original DFP value may be reconstructed according to the following expression: $(-1)^{sign} * 10^{exponent-6176} * significand$. Note that in each expression, the exponent must be adjusted by subtracting a constant. This adjustment is necessary because the exponent is stored in the BID encoding as a biased exponent, meaning the value stored in the encoded number is offset from the actual value by an exponent bias.

In addition to encoding a range of valid numbers, the formats also allow for the encoding of infinite (INF) values and both quiet and signaling Not a Number (NaN) values. Further, the range of representable numbers can also be encoded in different ways based upon the number of bits required for a value's significand and exponent. For example, 64-bit DFP numbers of decimal64 type have a precision of 16 decimal digits. To provide this precision, certain DFP values with fewer than 16 decimal digits are encoded with a 53-bit significand, and certain DFP values with 16 decimal digits are encoded using only a 51-bit significand. In the former case, 53 explicit significand bits stored in the coefficient field and coupled with one implicit '0' bit to create a 54-bit significand. In the latter case, 51 explicit bits are stored in the coefficient field and coupled with 3 leading implicit bits (100b) to create a 54-bit significand. Because there are many encodings for each type of BID formatted number, most BID computation heavily relies upon the use of software libraries that use scalar instruction sets and serially-dependent algorithms to determine which encoding is used for a number and then extract its three important fields—the sign, exponent, and significand. This abstraction removes much effort from the part of a programmer, but the library routines built from scalar sequences are not optimal because of the extensive number of steps required to detect special case values (e.g., INF, NaN) and the significant reconstruction effort required to transform values from the non-contiguous bit fields into the computational components of the 54-bit significand and the biased exponent.

An aspect of an embodiment of the invention presents an instruction that, when implemented by a processor in a computing device, speeds up the conversion between BID-encoded bit fields to the three logical components allowing for binary-integer computation, and further provides an efficient way to differentiate between BID normal values, special values, and non-numerical encodings. Thus, for example, a list of BID-encoded values may be pruned to remove NaN and infinite values while also transforming the remaining values into encodings suitable for efficient arithmetic computations or conversion into human readable representations.

BIDSplit

Embodiments of BIDSplit instructions are detailed below along with embodiments of systems, architectures, instruction formats, etc., that may be used to execute such instructions. The BIDSplit instructions contain a destination operand, a source operand, and a control operand. The destination operand is a register, the source operand may be registers or memory locations, and the control operand may be registers or immediate values. However, other well-known configurations would work equally well, such as the destination operand being a memory location. The described BIDSplit instructions may be implemented with any of these combinations, and are also able to be implemented in little-endian or big-endian schemes or systems.

When executed, a BIDSplit instruction causes a processor to examine one or more BID-encoded decimal floating-point numbers within a source operand and determine if the one or more bits of the encoded numbers match against a bit pattern representing an encoding type specified in a control operand. Each bit pattern, or encoding type, represents a test for a particular BID-encoding scheme, such as the 53-bit significand scheme, the 51-bit significand scheme, infinite values, and NaN. If the processor determines that an encoding type bit pattern, as specified in the control operand, matches a sub-field of one of the BID-encoded numbers in the source operand, the processor will write results to the destination register depending upon a match state of TRUE (1) or FALSE (0). This match state may be returned in various ways, such as in a bit in the flag register or as a bit in the destination register. For example, when the control operand includes an encoding type bit pattern signifying "match all BID-encoding types except the 53-bit significand encoding type" is specified for BID64Split, a match state of TRUE indicates that the encoded value is not encoded using the 53-bit significand encoding type. As a result, the processor would update a bit in the flag register or in the destination. Alternatively, if this bit pattern were to instead generate a match state of FALSE, which indicates that the BID-encoded number being tested is encoded using the 53-bit significand encoding type, the processor will extract the 53-bit significand and/or other components into the location specified by the destination operand. Similarly, the match state will also be returned as a "status" bit in the flag register or as a bit in the destination.

An exemplary format of a BIDSplit-style instruction is "BID64Split 8m1, reg2/mem64, imm8," where BID64Split is an instruction for splitting BID decimal64 encodings, 8m1 is a 128-bit vector register to be used as a destination for instruction output, and reg2/mem64 is a 64-bit register or memory location to be used as a source containing a BID-encoded number. In embodiments of the invention, these registers and memory locations may be different sizes, such as 32 bits, 128 bits, etc. In other embodiments, 8m1 may be a memory address. Finally, "imm8" is an immediate 8 bits providing control data to be used in examining the encoded value in the source operand, but in embodiments of the invention this argument may alternatively be a register of varied size or a memory address. In other embodiments, the immediate value is a different size such as 16 bits.

BID Decimal64 Encoding

Embodiments of the disclosed invention are operable to work with any size BID encoding. However, to aid in the understanding of the invention, details regarding the decimal64 encoding of BID are presented. The encoding of such numbers may be determined by examining several bits after a leading sign bit in a "combination" field. For example, if a '00', '01', or '10' bit pattern follows the sign bit, then the exponent field consists of the 10 bits following the sign bit and the significand is the remaining 53 bits out of the 64. In this scenario, the 53 bits of significand are then joined with an implicit beginning '0' bit, making the significand 54 bits in total.

Alternatively, if a '11' pattern follows the sign bit, the encoded number is not in a "53-bit" encoding, and further examination of subsequent bits is required. For example, if the number has a '1100' pattern after the sign bit, the 10-bit exponent field begins after both the sign bit and the following '11' bits. This leaves 51 bits for the significand, which are combined with an implicit '100' leading 3-bit sequence to create a 54-bit significand.

Further, if either a '1101' or '1110' pattern follows the sign bit, the number is a non-canonical encoding. The IEEE-754-2008 specification treats these numbers as zero values, and embodiments of the invention may do the same or handle such encodings differently. Additionally, if a '11110' bit pattern follows the sign bit, the encoded number is infinity. If a '111110' pattern follows the sign bit, the encoded value is a "quiet NaN" and a '111111' pattern indicates a "signaling NaN."

For the 51-bit and 53-bit encodings of decimal64, the exponent is a biased value. The true exponent is determined by subtracting the bias (398) from the biased exponent. Similar schemes exist for other DFP encodings such as decimal32 (where the bias is 101) and decimal128 (where the bias is 6176), and while the implementation details for each vary slightly, the general process of testing and decoding remains the same.

BID64Split

FIG. 1 illustrates an embodiment of the invention for performing a BID64Split instruction for 53-bit extraction in a processor. In FIG. 1, the process for executing an instruction with the format "BID64Split 8m1, reg2/mem64, imm8" in a little-endian system is presented 100. The first operand, a vector register 8m1, is a destination operand, and the second operand, a 64-bit register or a memory location, is a source operand. In this embodiment, the format of the third operand, imm8, contains two logical fields 102. First, bits 0-4 represent an exponent offset, which is indicated by "Exp_Offset." In an embodiment, the Exp_Offset field is an unsigned 5-bit value to specify the location of the exponent in reference to an origin, which in this case, is the sign bit (bit 63). In the provided imm8 example 104, the Exp_Offset contains a value of "1", which indicates the extractable data portion of the source for a single valid encoding type has the exponent starting one bit away from the sign bit, pending a pattern match result indicating the input encoding has a valid extractable significand. The remaining three bits 5-7 of the imm8 format 102 are designated as "NZ Len," which stands for Non-Zero length. These three bits specify an unsigned "2-plus-encoded" number, meaning that the integer value encoded within this field will be added to the integer two. The resulting number will indicate the length of consecutive non-zero bits in a mask that will be used to compare against the raw BID-encoded data indicated by the source operand. In the depicted example 104, bits 5-7 contain the value zero. Using "2-plus-encoding," the number "2" is added to "0" to get "2". Thus, due to the control operand, the created mask will contain two consecutive non-zero bits 106, which will start immediately after the first sign bit.

In an embodiment that can support both big endian data and little endian data, the control operand format 102 will also include bits to represent an "NZ Offset" (Non-Zero offset), which indicates where in the mask the consecutive non-zero bits should begin in reference to the sign bit. In an embodiment with such an NZ offset value, a signed 2-bit value (representing values between "−2" and "1") specifies the location of the non-zero bit pattern within a Qword boundary of the mask in terms of a number of bits, wherein negative offsets specify that the non-zero bit pattern will start from the most significant bit in descending order, and will be interpreted as the negative value modulo 64.

In an embodiment, the created mask 108 contains 62 bits of 0s and 2 bits of 1s, and the two non-zero bits begin right after the sign bit. The mask 108 will be applied against the source operand 110, which in this illustration is 64 bits but can vary in size in different embodiments. The physical layout of the source operand 110 includes five different fields. First, bits 0-49 are labeled as "C-Coeff" and contain bits to be used in an extracted significand. Similarly, bits 53-60 are labeled as "C-exp" and contain bits to be used as part of an extracted biased exponent. Bit 63 contains the sign bit, wherein a '1' indicates that the encoded number is negative and a '0' indicates that the number is positive. Bits 50-52, labeled as Cmbl ("combo low"), and bits 61-62, labeled as Cmbh ("combo high"), are bit ranges that may ultimately be used as part of the extracted significand, exponent, or neither, depending upon the encoding variant.

Because the "NZ Len" of 0 resulted in a mask with two consecutive non-zero bits, the mask will be used to detect if the first two bits after the sign bit are both '1'. This configuration is used to test for "53-bit" encodings, where the first two bits after the sign bit are not both '1' bits, as detailed above.

The mask 108 is then applied to the source operand 110 by performing an AND operation to create a mask result. An indication of a comparison between the mask result and the mask itself is noted as a match state "Status" 112: if the mask result and the mask are the same, the Status is set to '1'; if the mask result and the mask are not the same, the Status is set to '0'. A flag bit is updated to the value of this Status 113, and the data to be written to the destination vector register 8m1 depends upon this Status value 114.

When the Status is set to '1', and therefore the source's first two bits after the sign bit are both '1', the encoded value in the source does not use the "53-bit encoding" variant. In this embodiment, the processor will write all 0s to the destination vector register 8m1 115. In other embodiments, the processor may update a particular bit or set of bits in the destination register or memory, update a flag in another register (e.g. an overflow bit, a predicate bit, a general error bit, etc.), or perform a similar operation.

On the other hand, if the Status is set to '0', the BID-encoded number within the source operand is encoded using the "53-bit" pattern, and a "53-bit extraction" is performed to generate valid output in 8m1 116. Thus, bits 0-49 from the C-Coeff field 120A and bits 50-52 from the Cmbl field 120B are extracted and placed in bits 0-52 of the destination operand 8m1 116. Similarly, the sign bit of bit 63 of the source 120E is extracted and placed in bit 127 of the destination vector register 8m1 116. Also, because the Exp_Offset field of the control operand contains a value of "1", the exponent will be extracted from the source operand starting one bit away from the sign bit, so bits 53-60 of the C-exp field 120B and bits 61-62 of Cmbh 120D are extracted and placed in bits 64-74 of 8m1 116.

A useful example detailing one way to use such a BID64Split instruction to determine and extract BID-encoded values according to one embodiment of the invention is presented below in Table 1 using assembly-type code. This example assumes that if the encoding type within the control operand matches the actual encoding type of the source number, an overflow flag bit will be set. This code first uses a BID64Split instruction with a BID-encoded decimal64 number as a source operand, testing to see if it is a "53-bit" encoded number. If it is a "53-bit" encoded number, and thus an overflow bit is set, the code jumps to a "L_GotNormal53" label to further process the extracted sign, significand, and exponent that exist in 8m1; otherwise the code tests for a "51-bit" number. Similarly, if the number is not encoded according to the "51-bit" encoding variant, the code continues on to test for an encoded infinite number and then for quiet and signaling NaN encodings, jumping to a custom handler code section upon determining an encoding.

TABLE 1

```
/* test for all other case except 53-bit significand and extract 53-bit
significand and biased-exponent if number is within range of 53-bit
significand */
BID64split 8m1, [_dec64], 0x01
JNO L_GotNormal53
/* test for INF or NANs and extract 51-bit significand and biased exponent
if number requires implicit leading 100b plus 51 least significant bit */
BID64split 8m1, [_dec64], 0x41 ; test for 51-bit
JNO L_MaybeNormal54
/* test for inf, coefficient will be discarded */
BID64split 8m1, [_dec64], 0x61 ; test for inf
JNO L_GotInt
/* test for QNaN/SNaN, coefficient will be discarded */
BID64split 8m1, [_dec64], 0x81 ; test for QNaN/SNaN
JNO L_GotNan
```

Pseudo-code describing the logical workings of a BID64Split instruction is presented below in Table 2. This code represents the workings of a "BID64Split 8m1, reg64/mem64, imm8" or a similar "BID64Split 8m1, 8m2/mem64, imm8" instruction that extracts data from the low 64-bits of vector register 8m2 (little endian) using imm8 as a control into vector register 8m1 and returns a status indicator in a flag bit. The code first creates a bit pattern "Mask" from the NZLen field. The "Exp_Offs" value determines where to extract a 10-bit biased exponent and how many bits to extract into the significand component. The MaskLen, or length of the mask, is determined as two plus the value of NZLen, which illustrates the "2-plus" encoding. Then, an ending location, or MaskEnd, is set to "62". Next, an ExpbiaEnd, or "biased exponent ending location," is calculated using the Exp_Offs value. In an embodiment of the invention, the destination register is cleared, and the mask is created. The mask is then logically "AND"ed with the input BID-encoded number in the source and the intermediate result is compared to the mask itself: if they equal, a Status value is set to "1", representing a condition where no valid significand value can be extracted from the source (i.e. the encoding type in the combination field of the source operand can be one of many cases ranging between NaN, INF, non-canonical encodings, or greater than the 53-bit significand); otherwise the Status value is set to "0" (i.e. a valid significand can be extracted from the coefficient and the 3 least-significant bits of the combination field). Next, the significand and the biased exponent components are extracted and a status flag bit (OF) is updated to reveal the results of the bit pattern match with the Mask.

TABLE 2

```
NZLen<- Imm[7:5], Exp_Offs <- Imm[4:0];
MaskLen <- NZLen + 2;
MaskEnd <- 62;
ExpbiaEnd <- 63-Exp_Offs;
Dest[127:0] <- 0;
Mask <- (( 1LL << MaskLen) –1) << (MaskEnd – MaskLen);
Status <- ((Mask & Src) == Mask)? 1: 0; // Src is input operand
Dest[127] <- Src[63];
Dest[73:64] <- Src[ExpBiaEnd:ExpBiaEnd–9];
Dest[52:0] <- Src[ExpBiaEnd–10:0];
OF <- Status;
```

Figure 2:
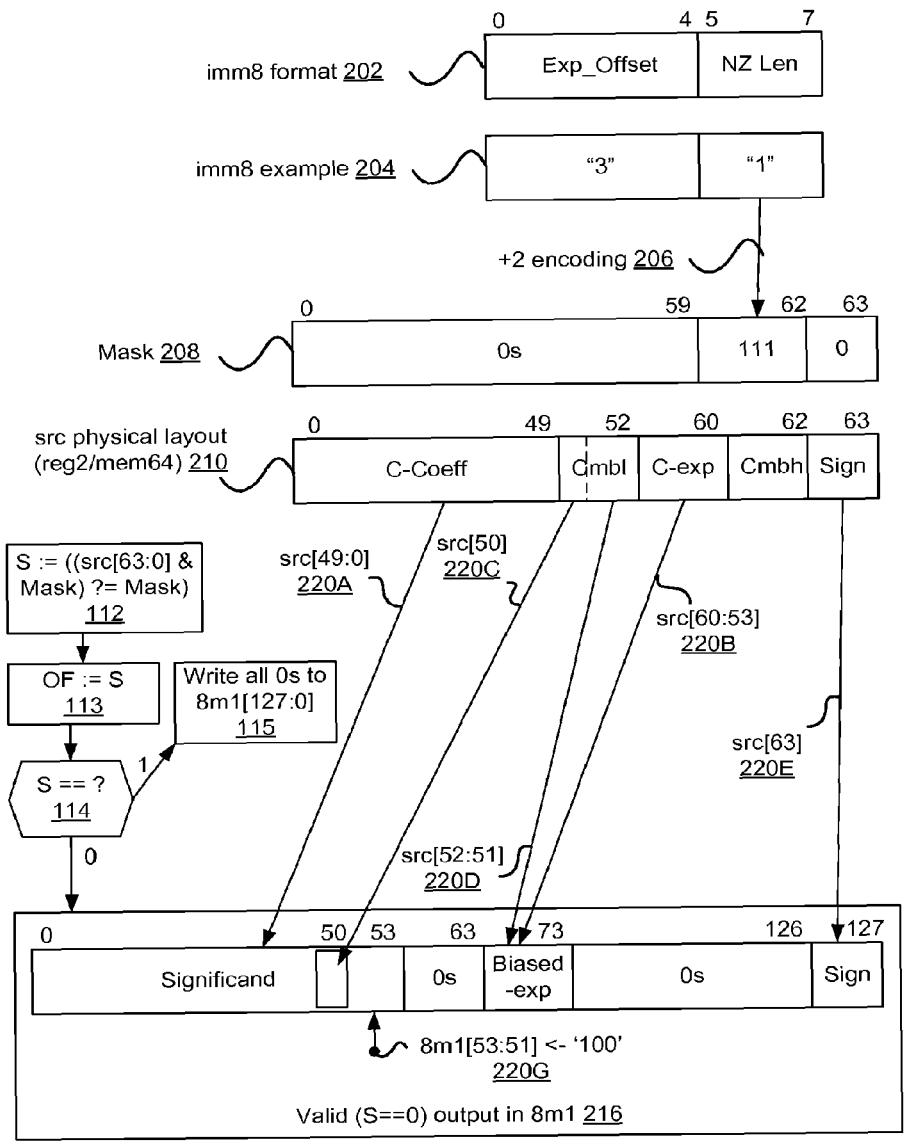
FIG. 2 illustrates an embodiment of the invention for performing a BID64Split instruction for 51-bit extraction in a processor.
Figure 3:
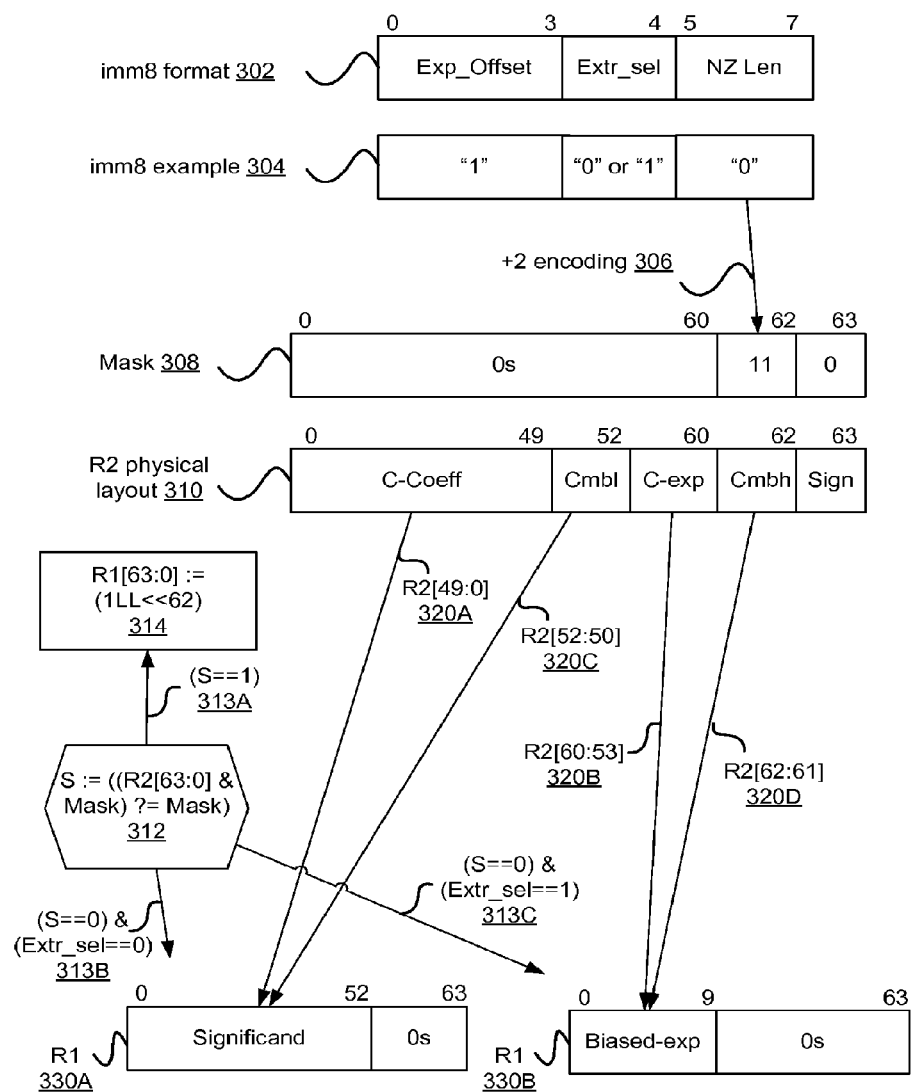
FIG. 3 illustrates an embodiment of the invention for performing a BID64Split instruction with 64-bit source and destination register operands for 53-bit extraction in a processor.

FIG. 2 illustrates an embodiment of the invention for performing a BID64Split instruction for "51-bit" extraction in a processor. Just as in FIG. 1, this diagram depicts a "BID64Split 8m1, reg64/mem64, imm8" or "BID64Split 8m1, reg2/mem64, imm8" instruction 200; however, this diagram illustrates testing for a "51-bit" value in the source operand.

Again, the imm8 control operand format 202 contains an Exp_Offset field and an NZ Len field. However, the sample data includes an Exp_Offset field containing a value of "3" and the NZ Len field contains a value of "1". Using "plus-two" encoding, a 3-bit consecutive non-zero mask 208 is created starting after the sign bit. The result of the mask "AND"ed with the source operand 210 is compared to the original mask 212 and stored as a Status 112. This value is also stored as a flag 113. If the Status is "1" 114, the processor writes all 0s to the destination vector register 8m1 215. If the mask result does not equal the mask 214, the significand, biased exponent, and sign will be output in the destination register 8m1 216.

"51-bit" extraction occurs in a slightly different manner than the "53-bit" extraction from FIG. 1. While the entire "C-Coeff" field is used in the extracted significand 220A, only the least significant bit from Cmbl is used 220C. These 51 bits can be extended by the processor by "OR"ing implicit leading '100' bits 220G.

Additionally, because the control operand Exp_Offset contains the value three, the exponent to extract is located three bits away from the sign bit 220E. Thus, the entire Cmbh field is ignored, and bits 51-52 of Cmbl 220D are joined with the bits 53-60 of C-exp 220B to create the biased exponent.

FIG. 23 illustrates an embodiment of the invention for performing a BID64Split instruction with 64-bit source and destination register operands for "53-bit" extraction in a processor. This "BID64Split R1, R2, imm8" instruction 2300 utilizes a 64-bit destination operand, a 64-bit source operand, and an eight bit immediate control operand. Further, this embodiment adds another field to the control operand, "Extr_sel," which allows the caller to designate whether the significand or the biased exponent are to be extracted into the destination register. In another embodiment without the "Extr_sel" field, output may be extracted to both the source and destination registers; for example, the significand may be extracted into the destination register and the biased-exponent is extracted into the source register, overwriting the original input value. Additionally, this embodiment performs signaling upon an encoding type mismatch (or bit pattern match) in a different manner. Instead of simply filling the destination register with all 0s, this embodiment writes a status bit to a location within the destination register to indicate whether a valid significand was extracted.

The control operand 2302 contains three logical fields: an "Exp_Offset" of 4 bits, an "Extr_sel" of 1 bit, and an "NZ Len" of 3 bits. In this provided example 2304, the Exp_Offset field contains the value one, and the NZ Len contains the value zero, which is "plus-two" encoded 2306 to create a mask 6K08 with a 2-bit non-zero consecutive bit pattern. This mask 2308 is applied to the source operand R2 2310 through an "AND"ing of the two values. If the result of this operation is equal to the original mask 2308, a match state "status" value is set to one; otherwise, the status value is set to zero 2312.

When the status value is one 2313A, the destination operand R1 is populated with a bit shifted 62 times to result in a '1' bit placed in a determined 'status' bit location 2314, and the instruction completes execution. This signifies that the BID-encoded value in the source operand R2 2310 is not encoded using the "53-bit" encoding. With the status value is zero, the source operand R2 2310 is encoded using the "53-bit" encoding, and one or more components will be extracted into the destination operand R1 depending upon the value of the Extr_sel field within the control operand 2304. When the Extr_sel value is zero 2313B, the significand is extracted from the C-Ceoff 2320A and Cmbl 2320C fields into the first 53 bits of the destination register R1 2330A. When the Extr_sel value is one 2313C, the biased exponent is extracted from the C-exp 2320B and Cmbh 2320D fields into the first 10 bits of the destination register R1 2330B.

BID64SplitQ

Figure 4:
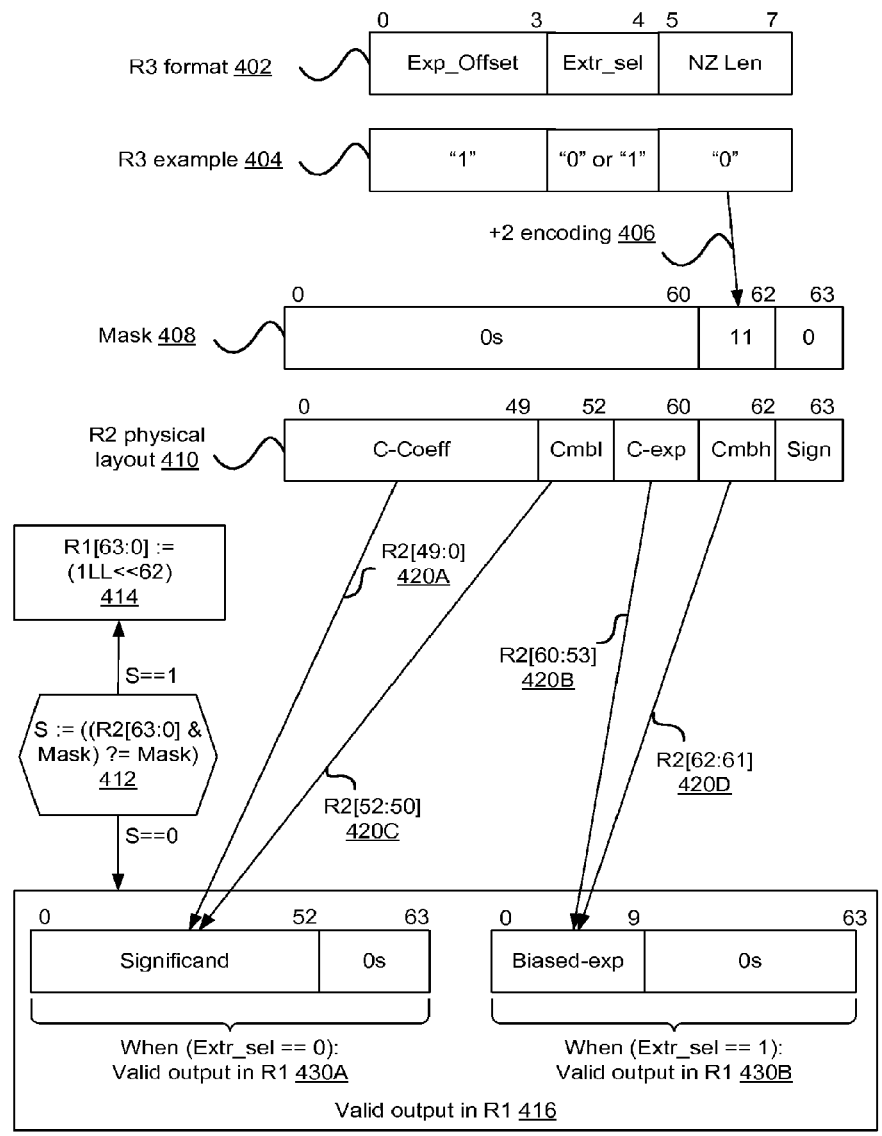
FIG. 4 illustrates an embodiment of the invention for performing a BID64SplitQ instruction with 64-bit register operands in a processor.

FIG. 4 illustrates an embodiment of the invention for performing a BID64SplitQ instruction with 64-bit register operands in a processor. Unlike FIGS. 1 and 2, which have 128-bit destination operands, the depicted instruction of FIG. 4—"BID64SplitQ R1, R2, R3" 400"—utilizes three 64-bit registers as operands.

The format of the control operand contains an Extr_sel field as well as the Exp_Offset and NZ Len fields 402. As presented in the example control operand 404, the Exp_Offset field contains the value "1" and the NZ Len field contains the value "0", which indicates that the test is to enable a "53-bit" extraction. In this embodiment, the Extr_sel field is one bit in length and therefore may possibly contain either the value "0" or "1". A value of "0" indicates that the significand shall be extracted pending the outcome of the bit pattern match, and a value of "1" indicates that the biased exponent shall be extracted.

Given the example source operand 404, a "plus-two" encoded 406 non-zero mask length leads to the creation of a mask 408 with two '1' bits starting just after the sign bit. The mask is then "AND"ed to the source operand and the result is compared to the original mask and noted as a match state Status 412. If the values are the same, the match state Status is "1" and the processor signals by writing a '1' bit to a status bit to be placed in bit number 62 of the destination register 414; otherwise, the match state Status is "0" and therefore the status bit 62 will be a '0'. The extraction continues with valid output in R1 416. When Extr_sel from the control operand is set to '00' 430A, the significand is extracted 430A using the C-Coeff bits 420A and three bits from the Cmbl field 420C. Bits 53 to 62 of R1 are set to 0s. In this and other embodiments of the invention, if the sign bit is not extracted, that bit location is set to "0".

If, on the other hand, Extr_sel contains the value "1", the biased exponent will be extracted 430B using the C-exp field 420B and two bits from the Cmbh field 420D. In an embodiment, the status bit will only be set when Extr_sel is equal to "0", and so callers must utilize BID64SplitQ by first using this option to attempt a successful extraction of the significand result.

Pseudo-code describing the workings of a BID64SplitQ instruction according to an embodiment of the invention is presented below in Table 3. This code represents the workings of a "BID64SplitQ R1, R2, R3" instruction that extracts data from R2 (little endian) into R1 using R3 as a split and mask control and returns a status indicator as a bit in the destination register R1. All operand registers are 64 bits. The code first creates and populates an NZLen variable, an Exp_Offs variable, and an Extr_Sel variable. The MaskLen, or length of the mask, is then determined as two plus the value of NZLen, and an ending location, or MaskEnd, is set to "62". Next, an ExpbiaEnd, or "biased exponent ending location," is calculated using the Exp_Offs value. Now, the destination register is cleared, and the mask is created. The mask is then applied against the source operand, and the result is compared to the mask itself: if they are equal, a match state "Status" value is set to "1", representing a condition where no valid significand value can be extracted from the source (i.e. the control operand and encoding type is not the same as the encoding type of the source operand); otherwise the Status is set to "0". At this point, if extraction is to occur because the encoding types match (as determined by the Status value), the component to be extracted depends upon the value of the Extr_Sel field from the control operand. If Extr_Sel contains the value "1", the biased exponent is extracted; if Extr_Sel contains the value "0", the significand is extracted. Finally, a status bit is updated in the destination register according to the content of the Status variable.

TABLE 3

NZLen<- R3[7:6], Exp_Offs <- R3[3:0], Extr_Sel <- R3[5:4];
MaskLen <- NZLen + 2;
MaskEnd <- 62;
ExpbiaEnd <- 63-Exp_Offs;
R1[63:0] <- 0;
Mask <- (( 1LL << MaskLen) –1 ) << (MaskEnd – MaskLen);
Status <- ((Mask & Src) == Mask)? 1: 0; // Src is input operand
If Status = 0 Then
Switch (Extr_Sel):
Case 1: R1[9:0] <- R2[ExpBiaEnd:ExpBiaEnd–9];
Case 0: R1[52:0] <- R2[ExpBiaEnd–10:0];
EndSwitch
EndIf
R1[62] <- Status;

BID32SplitD

Figure 5:
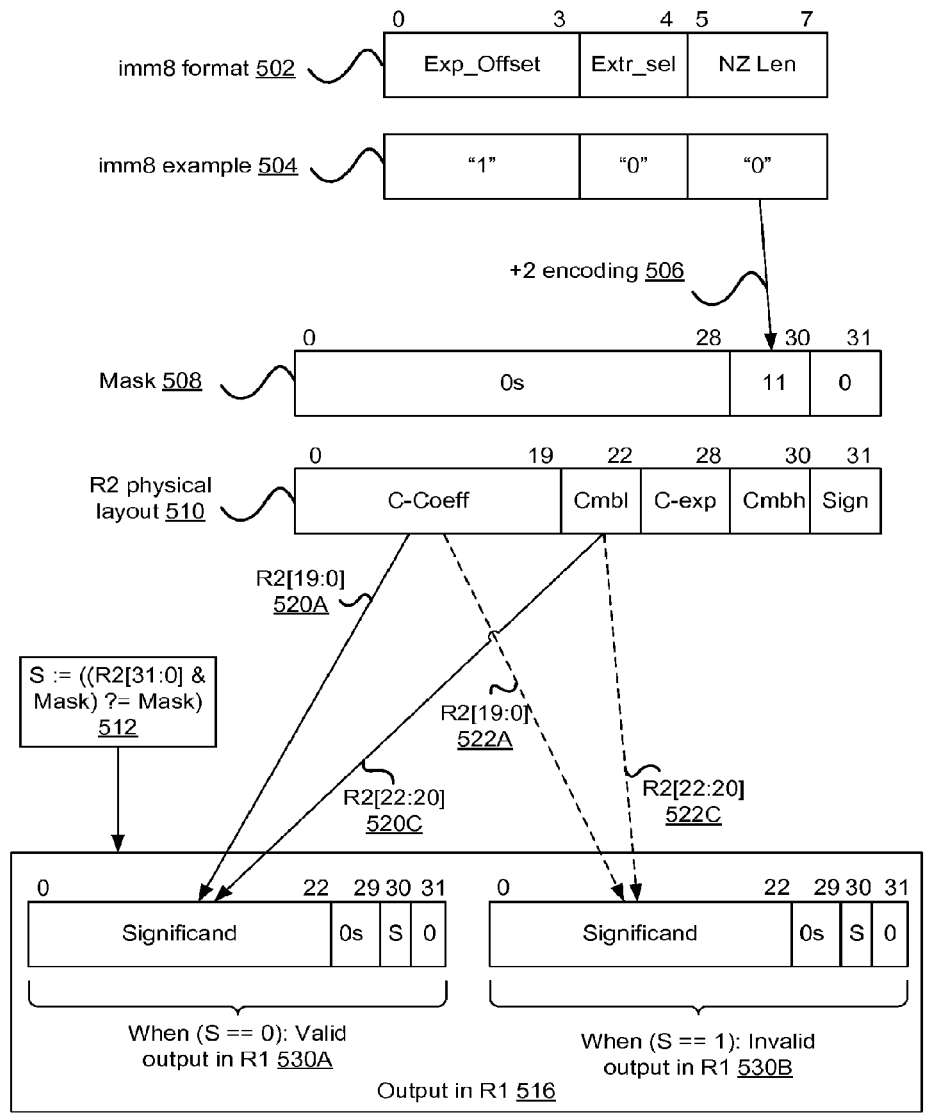
FIG. 5 illustrates an embodiment of the invention for performing a BID32SplitD instruction for an ISA providing 32-bit data registers in a processor.

FIG. 5 illustrates an embodiment of the invention for performing a BID32SplitD instruction for an ISA providing 32-bit data registers in a processor. This diagram represents the workings of a "BID32SplitD R1, R2, imm8" instruction 500 using two 32-bit registers as source and destination operands along with an immediate control value. Thus, the values in the source operand are encoded using decimal32 instead of decimal64. The format of the control value 502 is the same as in the last example, having an Exp_Offset, Extr_sel, and NQ Len. The example control value 504 illustrates that the test for extraction is for a "23-bit" encoding type with an implied "0" for a 24-bit significand (per the value "1" in the Exp_Offset field, and the value "0" in the NZ Len field). Also, the example Extr_sel value of "0" indicates that only the significand will be extracted.

Using two bits for the non-zero portion 506 of the mask 508, the mask is compared with the "AND"ed mask with R2, and the result is stored in a match state "Status" value S 512. The illustration of the physical output in the destination register 516 contains both invalid and valid output possibilities including the significand. If S is FALSE (i.e., equal to 0) 530A, a valid significand may be extracted, and the C-Coeff bits 0-19 are extracted 520A along with three bits of the Cmbl field 520C to create the significand, and bit 30 will be set to '0' to represent the value of the S variable.

Alternatively, if the S variable is TRUE (i.e., equal to 1) 530B, which indicates that the encoded value in R2 is not of a "23-bit" encoding type, bit 30 will be set to '1'. In an embodiment of the invention, all other bits 0-29 and 31 are set to 0. In another embodiment of the invention, the values from C-Coeff 522A and Cmbl 522C will still be extracted, even though they are meaningless.

BID128SplitDQ

Figure 6:
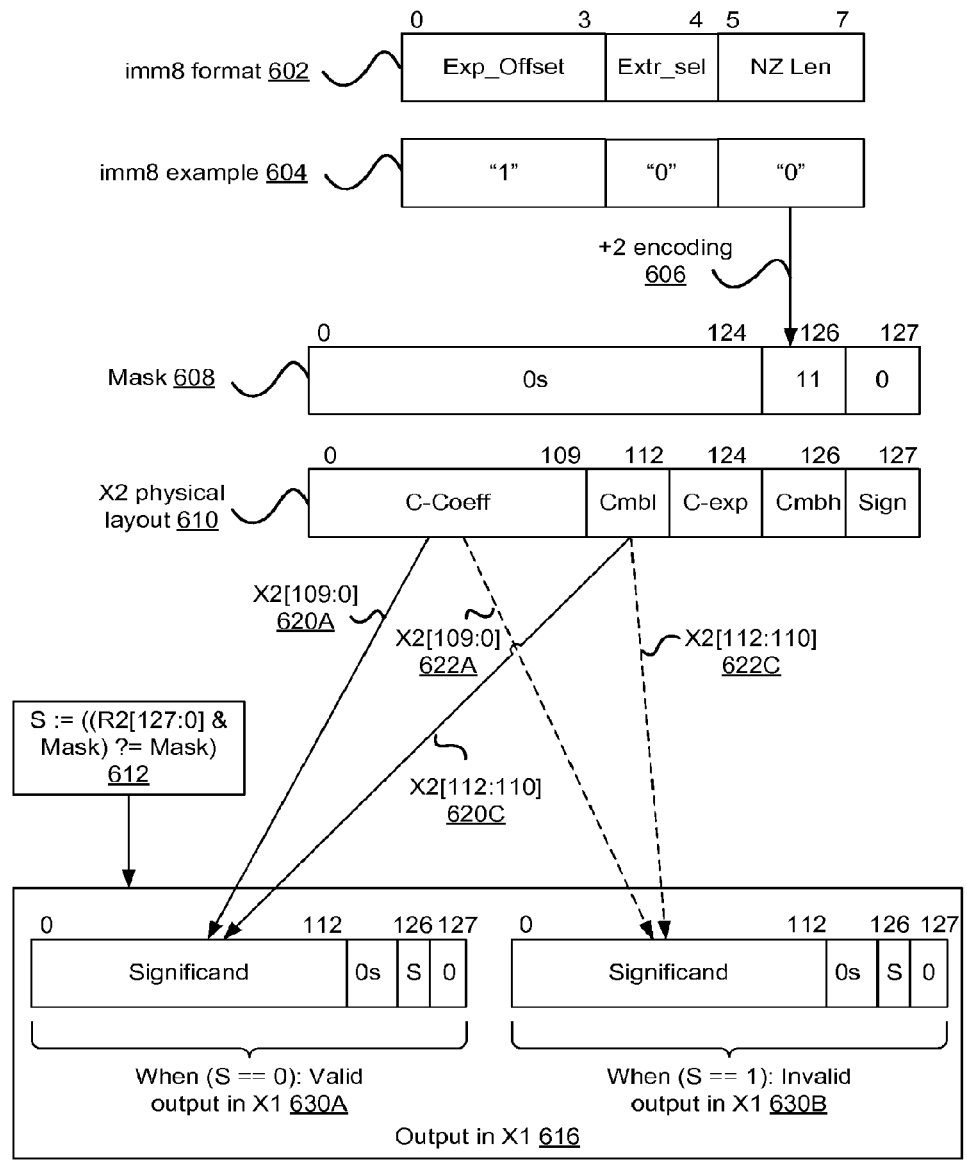
FIG. 6 illustrates an embodiment of the invention for performing a BID128SplitDQ instruction with 128-bit source and destination register operands in a processor.

FIG. 6 illustrates an embodiment of the invention for performing a BID128SplitDQ instruction with 128-bit source and destination register operands in a processor. The details of this embodiment are quite similar to the details of FIG. 5, except that the register sizes are now 128 bits wide, and the source operand values are encoded using decimal128. This instruction for "BID128SplitDQ R1, R2, imm8" 600 contains the same control operand format 602 as FIG. 5 and the same example data 604, too. The "plus-two" encoded 606 NZ Len will be used to create the mask 608, which is "AND"ed with the source register 610. The result of this operation is compared to the original mask 608, and a representation of equivalence or non-equivalence is stored in a match state Status variable 612. When constructing the output in the destination register R1 616, the output formats for valid 630A and invalid 630B extraction are the same. With valid extraction 630A allowing a valid significand to be extracted, the C-Coeff field 620A and three bits of the Cmbl field 620C are extracted into X1 as the significand, and the status bit 126 is set to 0. Similarly, with invalid extraction 630B where a valid significand cannot be extracted, the status bit 126 is set to 1. In an embodiment of the invention, all other bits in X1 are set to 0. In another embodiment of the invention, the significand field may be populated from the C-Coeff field 622A and the Cmbl field 622C, even though the significand is invalid.

VTBID128Split

Figure 7:
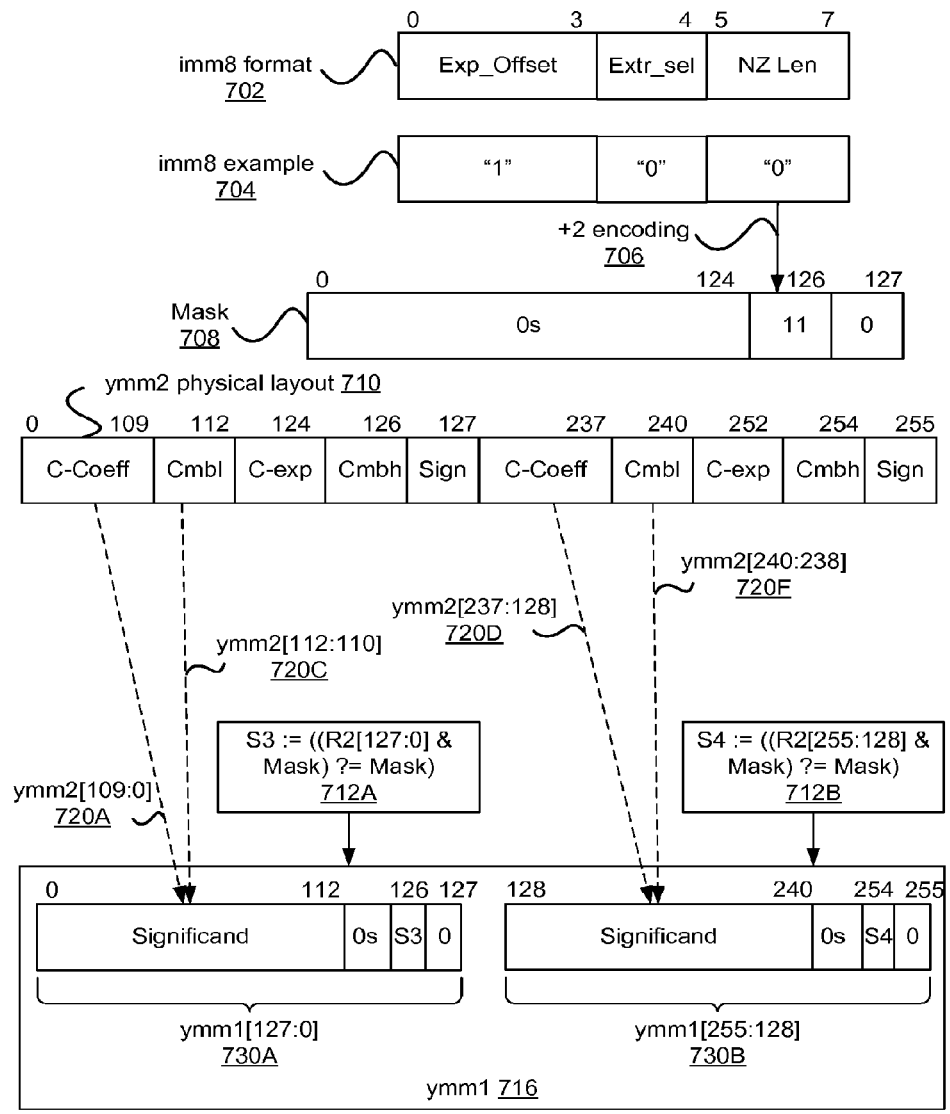
FIG. 7 illustrates an embodiment of the invention for performing a VTBID128Split instruction for common control twin extraction with 256-bit source and destination register operands in a processor.

FIG. 7 illustrates an embodiment of the invention for performing a VTBID128Split instruction for common control twin extraction with 256-bit source and destination register operands in a processor. This instruction, "VTBID128Split ymm1, ymm2, imm8" 700 utilizes 256-bit vector registers as the source and destination operands, along with 8 immediate bits to perform dual extraction wherein two separate BID-encoded decimal128 values are located within one 256-bit register. This instruction is particularly useful for performing mathematical operations requiring two arguments, such as addition, subtraction, multiplication, division, etc., as both arguments may be extracted in parallel. In this embodiment, the immediate control operand provides "common control," where one encoding type may be specified by the caller, and each of the encoded BID values will be compared against that type. In another embodiment, the control operand is larger (or configured differently) so as to allow for "dual control," meaning the caller could potentially specify a total of two encoding types to be used—one for each encoded BID value.

Here, the control operand format 702 contains an Exp_Offset field, an Extr_sel field, and an NZ Len field. The example control operand 704 supplies a value of "1" and "0" respectively for the Exp_Offset and NZ Len fields, so the test is for corresponding "113-bit" encodings/extractions. Further, since the Extr_sel field specifies the value "0", the significand will be extracted if the encoded value is encoded using the "113-bit" style encoding. (After a valid 113-bit significand is extracted, a non-canonical check can be performed on the extracted 113-bit values to make sure the values truly are correct.) With these values 706, one mask 708 is created containing two '1' bits because of the "plus-two" encoding specified by the value "0" from the NZ Len field. This one mask 708 is compared against the source operand ymm2 710 twice to create two match state Status values—once for the first bits 0-127 and saved as S3 712A, and once for the second encoded number in bits 128-255 and saved as S4 712B.

After performing the mask comparisons, the extracted valid output is placed into vector register ymm1 716: the first significand from ymm2 bits 0-109 from the C-Coeff field 720A and bits 110-112 from Cmbl 720C are extracted into bits 0-112 of ymm1 730A. The computed status bit 712A for this number, S3, is written to bit 126. The same procedure occurs for the second encoded number in ymm2, which exists in bits 128-255. The significand is populated from the C-Coeff 720D and Cmbl 720F fields into bits 128-240, and the status bit S4 712B is updated in bit 254 from the mask comparison of 712B.

In addition to implementing dual control of this dual extraction through a different control operand configuration, an embodiment may also perform such dual extractions with different precisions of binary-integer decimal values. For example, a VTBID64Split instruction may utilize a 128-bit (or larger) source operand that contains two separate BID-encoded decimal64 values to be extracted. Similarly, an embodiment of a VTBID32Split instruction could utilize a source operand of at least 64 bits that contains two separate BID-encoded decimal32 values to be extracted. Further, in all presented examples, the output from these extractions could easily be saved in different sized register or memory locations.

Figure 8:
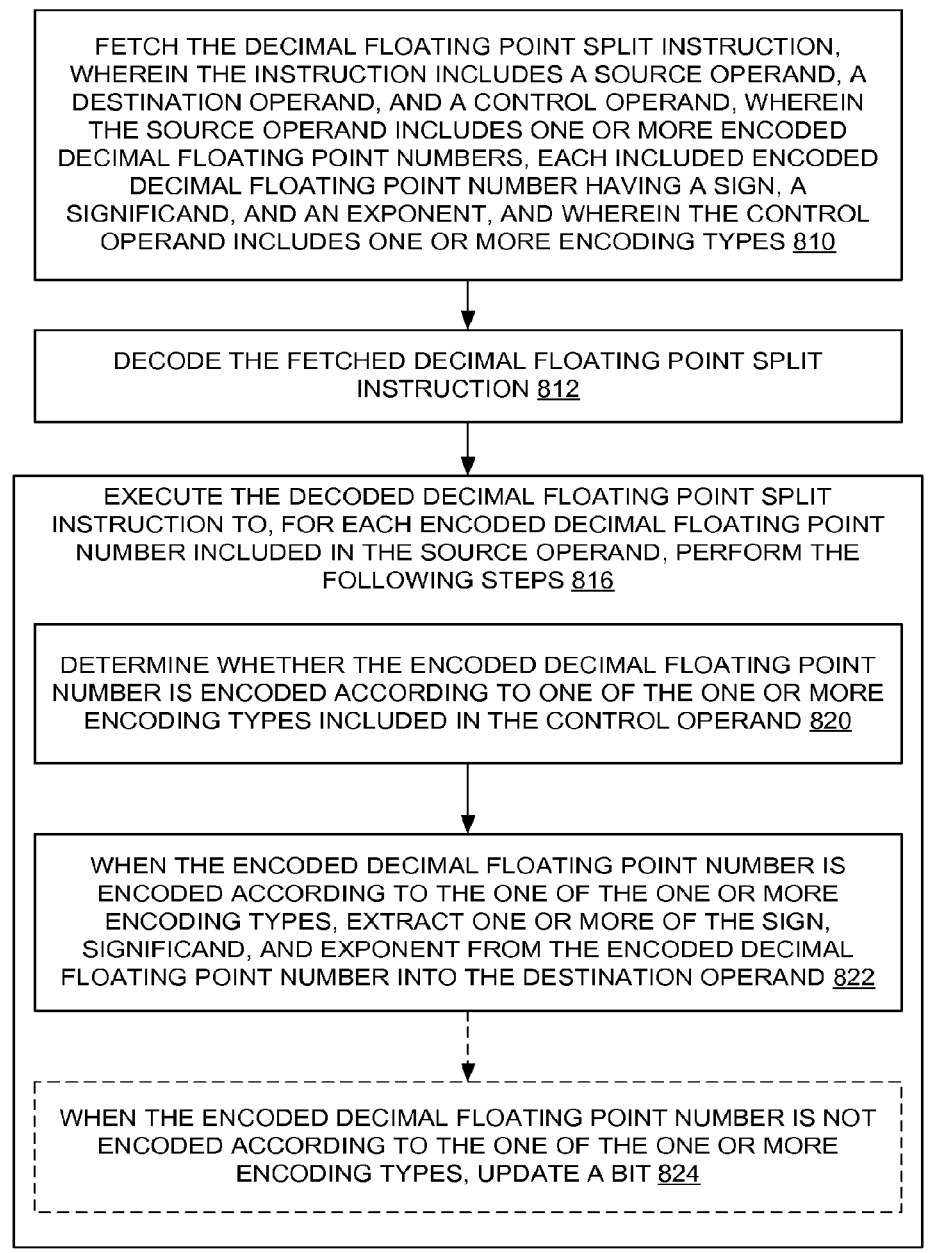
FIG. 8 illustrates an embodiment of a method for testing and extracting BID values by executing a BIDSplit instruction with a processor.

FIG. 8 illustrates an embodiment of a method for testing and extracting BID values by executing a BIDSplit instruction with a processor. At 810, the decimal floating-point split instruction is fetched. The instruction includes a source operand, a destination operand, and a control operand. The source operand may include one or more BID-encoded decimal floating-point numbers, each having a sign, exponent, and significand. The control operand includes one or more encoding types. These encoding types are made up of one or more subfields, and typically include an "NZ Len" field that specifies the length of non-zero bits to be used in a mask for determining the BID-encoding variant of the value.

At 812, the fetched decimal floating-point split instruction is decoded, and the decoded decimal floating-point split instruction is executed to, for each encoded decimal floating-point number included in the source operand, perform the following steps. At 820, the method determines whether the encoded decimal floating-point number is encoded according to one of the one or more encoding types included in the control operand. This occurs by comparing the created mask to the result of "AND"ing the mask with the encoded decimal floating-point number, and determining if they are equal. When the encoded decimal floating-point number is encoded according to the one of the one or more encoding types 822, the method extracts one or more of the sign, significand, and exponent from the encoded decimal floating-point number into the location specified by the destination operand. Optionally, in an embodiment of the invention, when the encoded decimal floating-point number is not encoded according to the one of the one or more encoding types, a bit is to be updated 824.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Exemplary Register Architecture

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers 8m0-15.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 04FFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 945, on which is aliased the MMX packed integer flat register file 950—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and 8M registers.

Alternative embodiments of the invention may use wider or narrower registers. Additionally, alternative embodiments of the invention may use more, fewer, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication, etc.) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
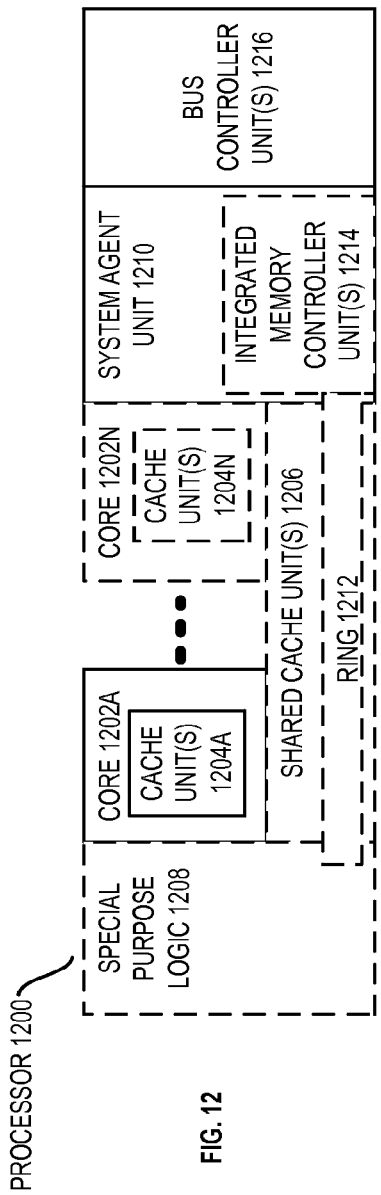
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
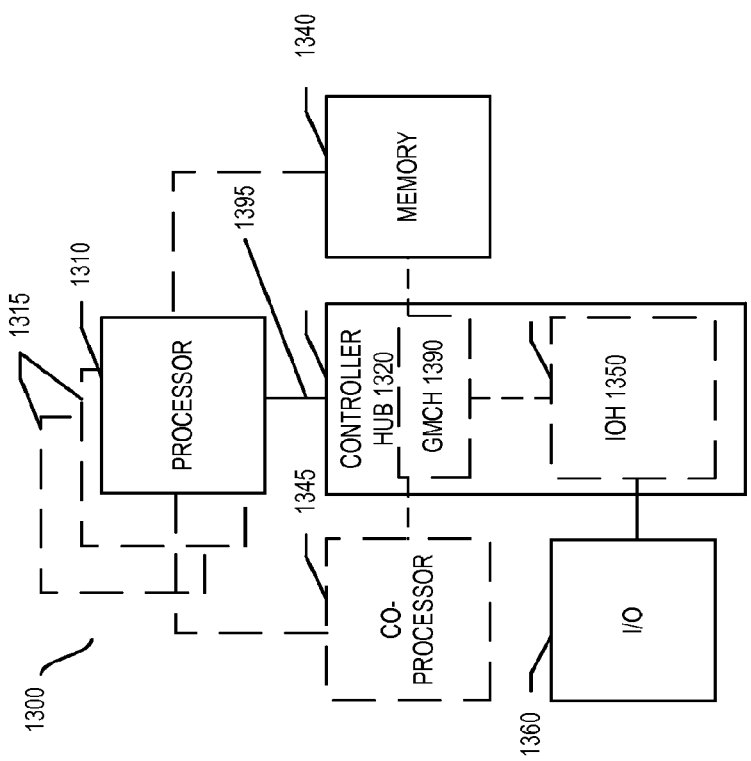
FIG. 13 is a block diagram of a system in accordance with one embodiment of the present invention.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
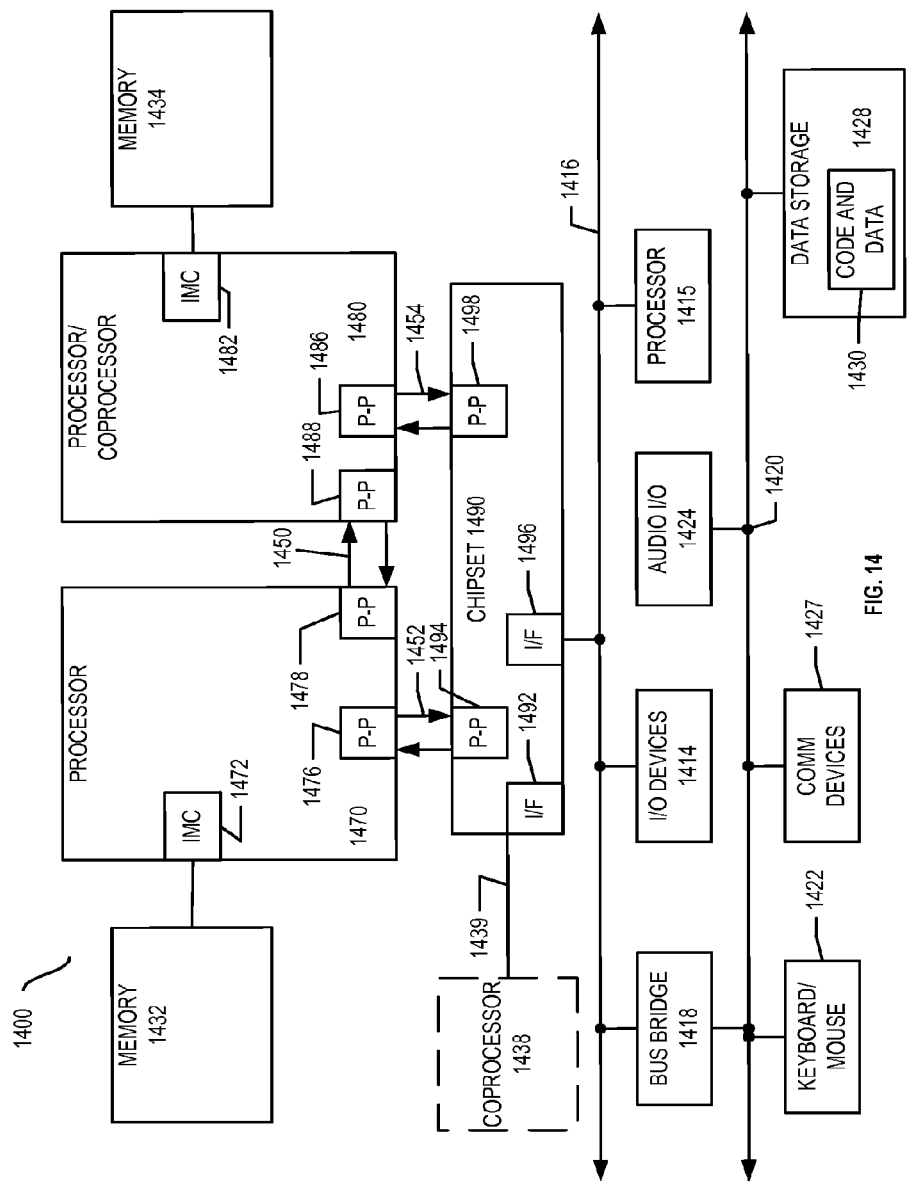
FIG. 14 is a block diagram of a first more specific exemplary system in accordance with an embodiment of the present invention.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect

1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
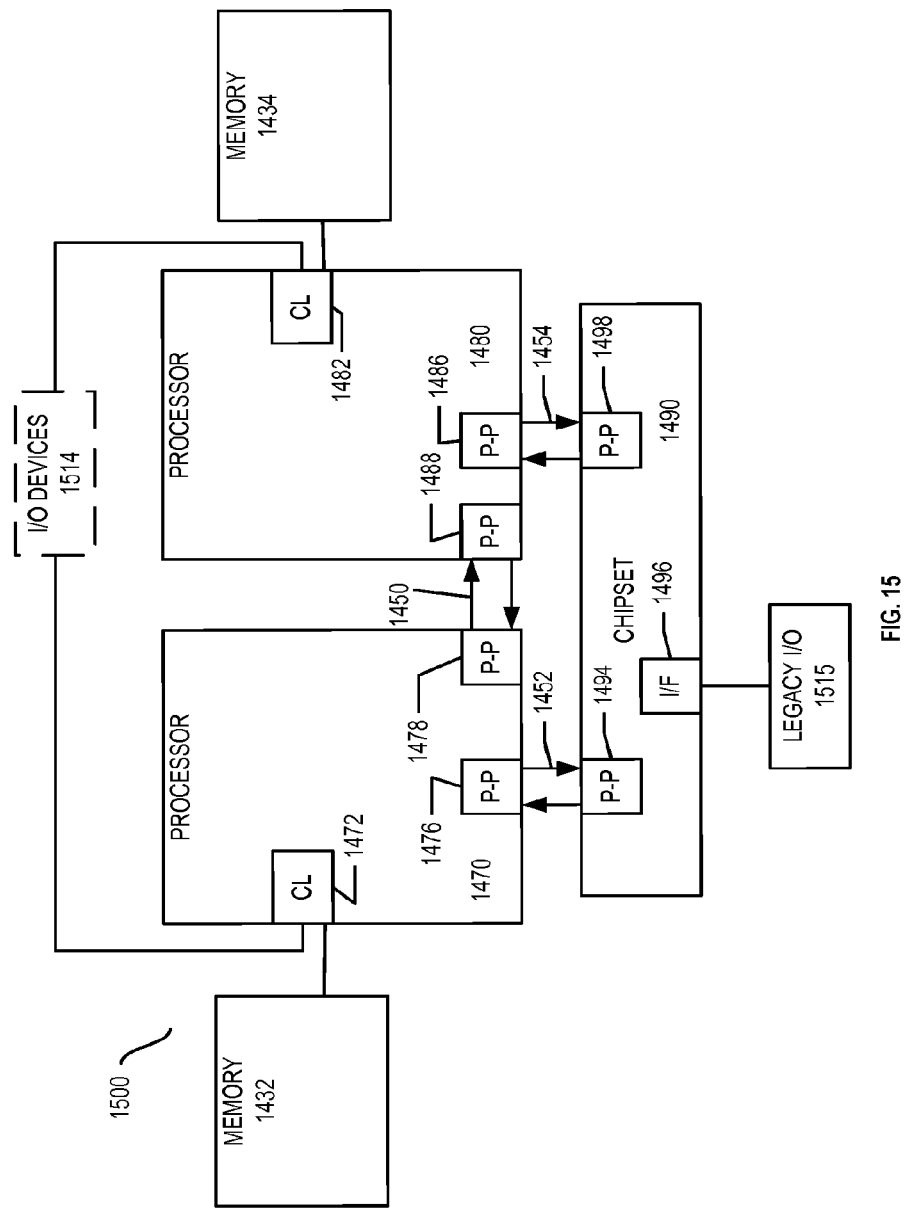
FIG. 15 is a block diagram of a second more specific exemplary system in accordance with an embodiment of the present invention.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
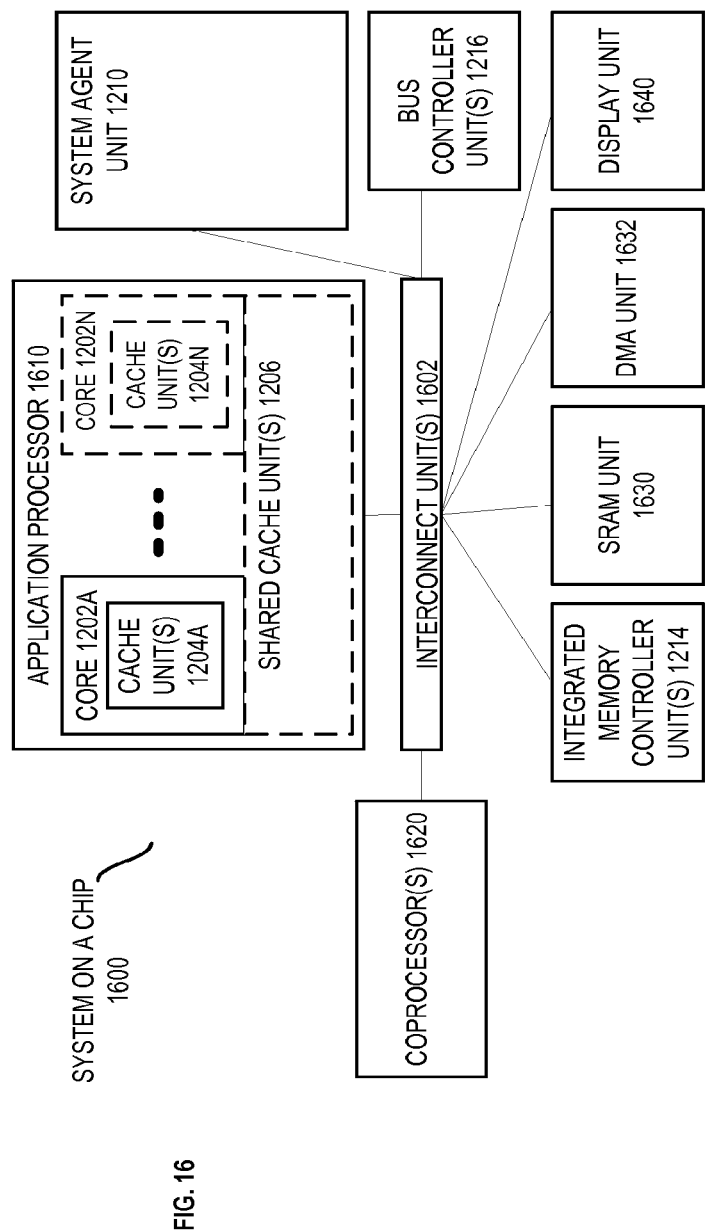
FIG. 16 is a block diagram of a system on a chip (SoC) in accordance with an embodiment of the present invention.

Referring now to FIG. 16, shown is a block diagram of a system on a chip (SoC) 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), rewriteable compact disks (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A method of performing a decimal floating-point split instruction in a computer processor, comprising:
    fetching the decimal floating-point split instruction, wherein the instruction includes a source operand, a destination operand, and a control operand, wherein the source operand includes one or more encoded decimal floating-point numbers, each included encoded decimal floating-point number having a sign, a significand, and an exponent, and wherein the control operand includes one or more encoding types in most significant bits of the control operand, each encoding type indicating a possible encoding format for an encoded decimal floating-point number and an extraction selection indicating which of the sign, significand, and a portion of the exponent should be extracted from the encoded decimal floating-point number into the destination operand wherein the extracted portion of the exponent is based on a value of least significant bits of the control operand;
    decoding the fetched decimal floating-point split instruction; and
    executing the decoded decimal floating-point split instruction to, for each encoded decimal floating-point number included in the source operand:
        determine whether the encoded decimal floating-point number is encoded according to one of the one or more encoding types included in the control operand, and
        when the encoded decimal floating-point number is encoded according to the one of the one or more encoding types, extract one or more of the sign, significand, and exponent according to the extraction selection included in the control operand from the encoded decimal floating-point number into the destination operand.

2. The method of claim 1, wherein:
    the source operand includes two or more encoded decimal floating-point numbers; and
    the control operand includes one encoding type.

3. The method of claim 1, wherein:
    the source operand includes a first encoded decimal floating-point number and a second encoded decimal floating-point number;
    the control operand includes a first encoding type and a second encoding type;
    when determining whether the first encoded decimal floating-point number is encoded according to one of the one or more encoding types included in the control operand, the one of the one or more encoding types is the first encoding type; and when determining whether the second encoded decimal floating-point number is encoded according to one of the one or more encoding types included in the control operand, the one of the one or more encoding types is the second encoding type.

4. The method of claim 1, wherein executing the decimal floating-point split instruction further comprises, when the encoded decimal floating-point number is not encoded according to the one of the one or more encoding types, update a bit.

5. The method of claim 4, wherein updating a bit comprises updating a bit within a flag status register.

6. The method of claim 4, wherein updating a bit comprises updating a status bit within the destination operand.

7. An apparatus comprising:
a hardware decoder to decode a decimal floating-point split instruction, wherein the decimal floating-point split instruction includes a source operand, a destination operand, and a control operand, wherein the source operand includes one or more encoded decimal floating-point numbers, each included encoded decimal floating-point number having a sign, a significand, and an exponent, and wherein the control operand includes one or more encoding types in most significant bits of the control operand, each encoding type indicating a possible encoding format for an encoded decimal floating-point number and an extraction selection to indicate which of the sign, significand, and a portion of the exponent should be extracted from the encoded decimal floating-point number into the destination operand, wherein the extracted portion of the exponent is based on a value of least significant bits of the control operand; and
execution logic to execute the decoded decimal floating-point split instruction, wherein an execution of the decoded decimal floating-point split instruction causes, for each encoded decimal floating-point number included in the source operand:
 a determination of whether the encoded decimal floating-point number is encoded according to one of the one or more encoding types included in the control operand, and
 when the encoded decimal floating-point number is encoded according to the one of the one or more encoding types, the extraction of one or more of the sign, significand, and exponent according to the extraction selection included in the control operand from the encoded decimal floating-point number into the destination operand.

8. The apparatus of claim 7, wherein:
the source operand is to include two or more encoded decimal floating-point numbers; and
the control operand is to include one encoding type.

9. The apparatus of claim 7, wherein:
the source operand is to include a first encoded decimal floating-point number and a second encoded decimal floating-point number;
the control operand is to include a first encoding type and a second encoding type;
when the determination of whether the first encoded decimal floating-point number is encoded according to one of the one or more encoding types included in the control operand is to occur, the one of the one or more encoding types is the first encoding type; and when the determination of whether the second encoded decimal floating-point number is encoded according to one of the one or more encoding types included in the control operand is to occur, the one of the one or more encoding types is the second encoding type.

10. The apparatus of claim 7, wherein the execution of the decoded decimal floating-point split instruction further causes, for each encoded decimal floating-point number included in the source operand when the encoded decimal floating-point number is not encoded according to the one of the one or more encoding types, a bit to be set.

11. The apparatus of claim 10, wherein the bit to be updated comprises a bit within a flag status register.

12. The apparatus of claim 10, wherein the bit to be updated comprises a status bit within the destination operand.

13. A tangible non-transitory machine-readable storage medium including a computer program operable to translate non-native program instructions to form native program instructions decodable by an apparatus for processing data having processing logic operable to:
perform data processing operations and an instruction decoder operable to decode a decimal floating-point split instruction to perform data processing operations specified by the native program instructions, wherein the decimal floating-point split instruction includes a source operand, a destination operand, and a control operand, wherein the source operand includes one or more encoded decimal floating-point numbers, each included encoded decimal floating-point number having a sign, a significand, and an exponent, wherein the control operand includes one or more encoding types in most significant bits of the control operand, each encoding type indicating a possible encoding format for an encoded decimal floating-point number and an extraction selection indicating which of the sign, significand, and a portion of the exponent should be extracted from the encoded decimal floating-point number into the destination operand, wherein the extracted portion of the exponent is based on a value of least significant bits of the control operand, and wherein the native program instructions comprise:
 determining whether the encoded decimal floating-point number is encoded according to one of the one or more encoding types included in the control operand; and
 when the encoded decimal floating-point number is encoded according to the one of the one or more encoding types, extracting one or more of the sign, significand, and exponent according to the extraction selection included in the control operand from the encoded decimal floating-point number into the destination operand.

14. The tangible non-transitory machine-readable storage medium of claim 13,
wherein:
the source operand includes two or more encoded decimal floating-point numbers; and
the control operand includes one encoding type.

15. The tangible non-transitory machine-readable storage medium of claim 13,
wherein:
the source operand includes a first encoded decimal floating-point number and a second encoded decimal floating-point number;
the control operand includes a first encoding type and a second encoding type;

when determining whether the first encoded decimal floating-point number is encoded according to one of the one or more encoding types included in the control operand, the one of the one or more encoding types is the first encoding type; and when determining whether the second encoded decimal floating-point number is encoded according to one of the one or more encoding types included in the control operand, the one of the one or more encoding types is the second encoding type.

16. The tangible non-transitory machine-readable storage medium of claim 13, wherein the native program instructions further comprise, when the encoded decimal floating-point number is not encoded according to the one of the one or more encoding types, updating a bit.

17. The tangible non-transitory machine-readable storage medium of claim 16, wherein updating a bit comprises updating a bit within a flag status register.

* * * * *